(12) United States Patent
Van Vleck et al.

(10) Patent No.: US 8,410,970 B2
(45) Date of Patent: Apr. 2, 2013

(54) PROGRAMMING A UNIVERSAL REMOTE CONTROL VIA DIRECT INTERACTION

(75) Inventors: Paul Van Vleck, Austin, TX (US);
Steven M. Belz, Cedar Park, TX (US);
Gregory Edwards, Austin, TX (US);
James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 734 days.

(21) Appl. No.: 12/540,979

(22) Filed: Aug. 13, 2009

(65) Prior Publication Data
US 2011/0037637 A1     Feb. 17, 2011

(51) Int. Cl.
*H04L 17/02* (2006.01)
(52) U.S. Cl. ............... 341/176; 340/4.31; 340/12.28
(58) Field of Classification Search ............ 341/176
See application file for complete search history.

(56) References Cited

U.S. PATENT DOCUMENTS

| | | | |
|---|---|---|---|
| 4,626,848 A * | 12/1986 | Ehlers | 340/12.24 |
| 5,228,077 A | 7/1993 | Darbee | |
| 5,255,313 A | 10/1993 | Darbee | |
| 5,341,166 A * | 8/1994 | Garr et al. | 725/153 |
| 5,410,326 A | 4/1995 | Goldstein | |
| 6,008,735 A | 12/1999 | Chiloyan et al. | |
| 6,157,319 A | 12/2000 | Johns et al. | |
| 6,507,306 B1 | 1/2003 | Griesau et al. | |
| 6,650,248 B1 | 11/2003 | O'Donnell et al. | |
| 6,735,287 B2 | 5/2004 | Vishik et al. | |
| 6,809,779 B2 * | 10/2004 | Chang et al. | 348/734 |
| 6,998,997 B2 * | 2/2006 | Stevenson et al. | 340/4.31 |
| 7,046,185 B2 | 5/2006 | Griesau et al. | |
| 7,065,184 B2 | 6/2006 | Vishik et al. | |
| 7,106,209 B2 * | 9/2006 | Mui | 340/4.3 |
| 7,116,264 B2 | 10/2006 | Griesau et al. | |
| 7,154,566 B2 | 12/2006 | Gustafson et al. | |
| 7,170,422 B2 | 1/2007 | Nelson et al. | |
| 7,224,903 B2 | 5/2007 | Colmenarez et al. | |
| 7,272,145 B2 | 9/2007 | Chen et al. | |
| 7,415,502 B2 | 8/2008 | Vishik et al. | |
| 7,586,398 B2 * | 9/2009 | Huang et al. | 340/10.5 |
| 7,630,478 B2 | 12/2009 | Vishik et al. | |
| 7,671,758 B1 | 3/2010 | Seidel et al. | |
| 7,746,884 B2 | 6/2010 | Van Vleck et al. | |
| RE41,453 E | 7/2010 | Wall et al. | |
| 7,778,263 B2 | 8/2010 | Chen et al. | |
| 7,860,962 B2 | 12/2010 | White et al. | |
| 7,873,102 B2 | 1/2011 | Van Vleck et al. | |
| 7,949,105 B2 | 5/2011 | Vishik et al. | |
| 7,949,305 B2 | 5/2011 | Sullivan et al. | |
| 2003/0095641 A1 | 5/2003 | Vishik et al. | |
| 2003/0097413 A1 | 5/2003 | Vishik et al. | |
| 2003/0204435 A1 | 10/2003 | McQuilkin et al. | |
| 2003/0204815 A1 | 10/2003 | Edwards et al. | |
| 2004/0010602 A1 | 1/2004 | Van Vleck et al. | |
| 2004/0022247 A1 | 2/2004 | Chen et al. | |
| 2004/0042592 A1 | 3/2004 | Knott et al. | |

(Continued)

*Primary Examiner* — Khai M Nguyen
(74) *Attorney, Agent, or Firm* — Jackson Walker L.L.P.

(57) ABSTRACT

A method and system for programming a universal remote control (URC) to operate with a remote-controlled device is disclosed. Programming codes for the remote-controlled device may be transferred from an original remote control using a programming interface. The transfer may be performed directly with the URC. The transfer may also be performed using consumer-premises equipment of a multimedia content distribution network. The URC may be configured to use at least one of the programming codes to remotely control the remote-controlled device.

15 Claims, 7 Drawing Sheets

U.S. PATENT DOCUMENTS

| | | |
|---|---|---|
| 2004/0208588 A1 | 10/2004 | Colmenarez et al. |
| 2004/0247089 A1 | 12/2004 | Vishik et al. |
| 2005/0140521 A1* | 6/2005 | Lin et al. .................. 340/825.69 |
| 2006/0100998 A1 | 5/2006 | Edwards et al. |
| 2006/0179038 A1 | 8/2006 | Edwards et al. |
| 2006/0203973 A1 | 9/2006 | Vishik et al. |
| 2006/0251094 A1 | 11/2006 | Van Vleck et al. |
| 2007/0025449 A1 | 2/2007 | Van Vleck et al. |
| 2007/0038773 A1 | 2/2007 | White et al. |
| 2007/0130588 A1 | 6/2007 | Edwards et al. |
| 2007/0130607 A1 | 6/2007 | Thissen et al. |
| 2007/0268360 A1 | 11/2007 | Ahlgren |
| 2007/0294737 A1 | 12/2007 | Edwards et al. |
| 2008/0019386 A1 | 1/2008 | Chen et al. |
| 2008/0165283 A1 | 7/2008 | Brandt et al. |
| 2008/0174467 A1* | 7/2008 | Drimusz et al. .............. 341/176 |
| 2008/0180302 A1 | 7/2008 | Amron |
| 2008/0189736 A1 | 8/2008 | Edwards et al. |
| 2008/0235745 A1 | 9/2008 | Edwards et al. |
| 2008/0250468 A1 | 10/2008 | Sullivan et al. |
| 2008/0261514 A1 | 10/2008 | Pratt et al. |
| 2008/0297372 A1 | 12/2008 | Wouters |
| 2009/0019542 A1 | 1/2009 | Vishik et al. |
| 2009/0021651 A1 | 1/2009 | Pratt et al. |
| 2009/0025025 A1 | 1/2009 | Van Vleck et al. |
| 2009/0031375 A1 | 1/2009 | Sullivan et al. |
| 2009/0067591 A1 | 3/2009 | Belz et al. |
| 2009/0070696 A1 | 3/2009 | Belz et al. |
| 2009/0119181 A1 | 5/2009 | Pratt et al. |
| 2009/0125971 A1 | 5/2009 | Belz et al. |
| 2009/0132355 A1 | 5/2009 | Begeja et al. |
| 2009/0157473 A1 | 6/2009 | Belz et al. |
| 2009/0158369 A1 | 6/2009 | Van Vleck et al. |
| 2009/0158373 A1 | 6/2009 | Belz et al. |
| 2009/0180377 A1 | 7/2009 | Sullivan et al. |
| 2009/0187955 A1 | 7/2009 | Sullivan et al. |
| 2009/0237287 A1 | 9/2009 | D'Hoore et al. |
| 2009/0244403 A1 | 10/2009 | Beals |
| 2009/0245494 A1 | 10/2009 | Sullivan et al. |
| 2009/0249429 A1 | 10/2009 | Sullivan et al. |
| 2009/0288115 A1 | 11/2009 | Belz et al. |
| 2009/0289829 A1* | 11/2009 | Maier ........................... 341/176 |
| 2009/0312059 A1 | 12/2009 | Pratt et al. |
| 2009/0319607 A1 | 12/2009 | Belz et al. |
| 2010/0015999 A1 | 1/2010 | Belz et al. |
| 2010/0039214 A1 | 2/2010 | Pratt et al. |
| 2010/0039282 A1 | 2/2010 | Hostage et al. |
| 2010/0039392 A1 | 2/2010 | Pratt et al. |
| 2010/0039393 A1 | 2/2010 | Pratt et al. |
| 2010/0041374 A1 | 2/2010 | Vishik et al. |
| 2010/0042827 A1 | 2/2010 | Pratt et al. |
| 2010/0050270 A1 | 2/2010 | Pratt et al. |
| 2010/0057575 A1 | 3/2010 | Begeja et al. |
| 2010/0058381 A1 | 3/2010 | Begeja et al. |
| 2010/0060506 A1 | 3/2010 | Maier |
| 2010/0063863 A1 | 3/2010 | Begeja et al. |
| 2010/0069012 A1 | 3/2010 | Sullivan et al. |
| 2010/0082712 A1 | 4/2010 | Pratt et al. |
| 2010/0088149 A1 | 4/2010 | Sullivan et al. |
| 2010/0094901 A1 | 4/2010 | Edwards et al. |
| 2010/0104024 A1 | 4/2010 | Sullivan et al. |
| 2010/0113160 A1 | 5/2010 | Belz et al. |
| 2010/0115592 A1 | 5/2010 | Belz et al. |
| 2010/0115607 A1 | 5/2010 | Pratt et al. |
| 2010/0118748 A1 | 5/2010 | Pratt et al. |
| 2010/0119051 A1 | 5/2010 | Belz et al. |
| 2010/0121744 A1 | 5/2010 | Belz et al. |
| 2010/0122285 A1 | 5/2010 | Begeja et al. |
| 2010/0122286 A1 | 5/2010 | Begeja et al. |
| 2010/0122306 A1 | 5/2010 | Pratt et al. |
| 2010/0124905 A1 | 5/2010 | Pratt et al. |
| 2010/0125586 A1 | 5/2010 | Van Vleck et al. |
| 2010/0134338 A1 | 6/2010 | Belz et al. |
| 2010/0138499 A1 | 6/2010 | Belz et al. |
| 2010/0138876 A1 | 6/2010 | Sullivan et al. |
| 2010/0144368 A1 | 6/2010 | Sullivan et al. |
| 2010/0145766 A1 | 6/2010 | Begeja et al. |
| 2010/0149982 A1 | 6/2010 | Pratt et al. |
| 2010/0150327 A1 | 6/2010 | Belz et al. |
| 2010/0153764 A1 | 6/2010 | Pratt et al. |
| 2010/0153995 A1 | 6/2010 | Belz et al. |
| 2010/0158533 A1 | 6/2010 | Belz et al. |
| 2010/0161801 A1 | 6/2010 | Belz et al. |
| 2010/0162331 A1 | 6/2010 | Belz et al. |
| 2010/0174572 A1 | 7/2010 | Joseph et al. |
| 2010/0223549 A1 | 9/2010 | Edwards et al. |
| 2010/0235872 A1 | 9/2010 | Sullivan et al. |
| 2010/0275237 A1 | 10/2010 | Pratt et al. |
| 2010/0289685 A1 | 11/2010 | Pratt et al. |
| 2010/0289954 A1 | 11/2010 | Sullivan et al. |
| 2010/0302057 A1 | 12/2010 | Pratt et al. |
| 2010/0302058 A1 | 12/2010 | Belz et al. |
| 2011/0003587 A1 | 1/2011 | Belz et al. |
| 2011/0010745 A1 | 1/2011 | Belz et al. |
| 2011/0012710 A1 | 1/2011 | Sullivan et al. |
| 2011/0029887 A1 | 2/2011 | Pearson et al. |
| 2011/0037574 A1 | 2/2011 | Pratt et al. |
| 2011/0037611 A1 | 2/2011 | Van Vleck et al. |
| 2011/0037635 A1 | 2/2011 | Van Vleck et al. |
| 2011/0047284 A1 | 2/2011 | White et al. |
| 2011/0075727 A1 | 3/2011 | Van Vleck et al. |
| 2011/0090085 A1 | 4/2011 | Belz et al. |
| 2011/0093876 A1 | 4/2011 | Belz et al. |
| 2011/0093908 A1 | 4/2011 | Van Vleck et al. |
| 2011/0095873 A1 | 4/2011 | Pratt et al. |
| 2011/0109444 A1 | 5/2011 | Edwards et al. |
| 2011/0109490 A1 | 5/2011 | Belz et al. |
| 2011/0113459 A1 | 5/2011 | Crowe et al. |
| 2011/0114716 A1 | 5/2011 | Pratt |
| 2011/0115664 A1 | 5/2011 | Belz et al. |
| 2011/0131600 A1 | 6/2011 | Howcroft et al. |
| 2011/0131605 A1 | 6/2011 | Pratt et al. |
| 2011/0159861 A1 | 6/2011 | Pratt et al. |
| 2011/0161423 A1 | 6/2011 | Pratt et al. |

* cited by examiner

PROGRAMMING A UNIVERSAL REMOTE CONTROL VIA DIRECT INTERACTION

BACKGROUND

1. Field of the Disclosure

The present disclosure relates to remote-controlled devices and, more particularly, to programming universal remote-controlled devices.

2. Description of the Related Art

Remote-controlled devices provide convenient operation of equipment from a distance. Many consumer electronic devices are equipped with remote control features. Universal remote-controlled devices, may be configured to control different pieces of equipment.

DESCRIPTION OF THE EXEMPLARY EMBODIMENTS

In one aspect, a disclosed method for configuring a universal remote control (URC) includes transitioning the URC to a learning mode, and transferring, from an original remote control (ORC), at least one ORC code to the URC via a programming interface of the ORC. The method may further include determining an identity of a device associated with the ORC using the programming interface. The device may be controllable by the ORC. The programming interface may be removably coupled to the ORC. During said transferring, the programming interface may be physically coupled to the URC. In certain embodiments, the programming interface is wirelessly coupled to the URC during said transferring. The transferring may be performed by a radio-frequency identification (RFID) device coupled to the ORC and an RFID receiver included with the URC. The method may still further include reprogramming a previously configured URC control element by configuring the URC control element to perform an ORC operation. In the method, a confirmation may be displayed indicating that the URC has been successfully configured to control a device controllable by the ORC. The URC may further be used for controlling a device controllable by the ORC.

In another aspect, a disclosed method for configuring a URC using customer premises equipment (CPE) of a multimedia content distribution network (MCDN) may include receiving, via an ORC interface, at least one ORC code describing output generated by the ORC for controlling a remote-controlled device, and configuring the URC to control the remote-controlled device by sending the at least one ORC code to the URC. The method may further include establishing a galvanic coupling between the CPE and the ORC for receiving the at least one ORC code. The method may still further include displaying the at least one ORC code, and receiving user input for assigning ORC codes to URC control elements, while configuring the URC may be based on the user input. Configuring the URC may be performed using a wireless interface. The receiving may be performed using a different interface than the wireless interface.

In another aspect, a disclosed CPE for use within a client configuration of an MCDN may include a processor, and memory media accessible to the processor. The instructions may be executable by the processor to receive first information from an ORC identifying a remote-controlled device controllable by the ORC, and send a request to an MCDN server for programming codes for the identified remote-controlled device. After sending the request, the processor instructions may further be executable to receive second information, including the programming codes, and program a URC to use at least one of the programming codes.

In certain embodiments, the CPE includes processor executable instructions to display the programming codes to the user in response to first user input, and receive second user input specifying which of the programming codes to use for programming the URC. The remote-controlled device may be communicatively coupled to the CPE. The CPE may further include processor executable instructions to receive, from the URC, a command to control the remote-controlled device, while the command may be associated with at least one of the programming codes, and instruct the remote-controlled device to execute the command. The CPE may still further include processor executable instructions to display an indication that the URC has been successfully programmed.

In particular embodiments, when a number of received programming codes exceeds a number of control elements available on the URC, the CPE may include processor executable instructions to display a message indicating that certain programming codes are not available on the URC.

In yet another aspect, a disclosed computer-readable memory media includes executable instructions for configuring a URC. The instructions may be executable to receive at least one ORC code from an ORC via a programming interface, and use the at least one ORC code to control a remote-controlled device. The memory media may include instructions executable to initiate a learning mode on the URC in response to user input, and output an indication that the URC has been configured successfully to use the at least one ORC code. The memory media may further include instructions executable to associate a URC control element with an ORC code, and reconfigure a previously configured URC control element by configuring the URC control element to correspond to an ORC code. In response to detecting user input activating the URC control element, the instructions may be executable to output the associated ORC code to the remote-controlled device.

In the following description, details are set forth by way of example to facilitate discussion of the disclosed subject matter. It should be apparent to a person of ordinary skill in the field, however, that the disclosed embodiments are exemplary and not exhaustive of all possible embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Figure 1:
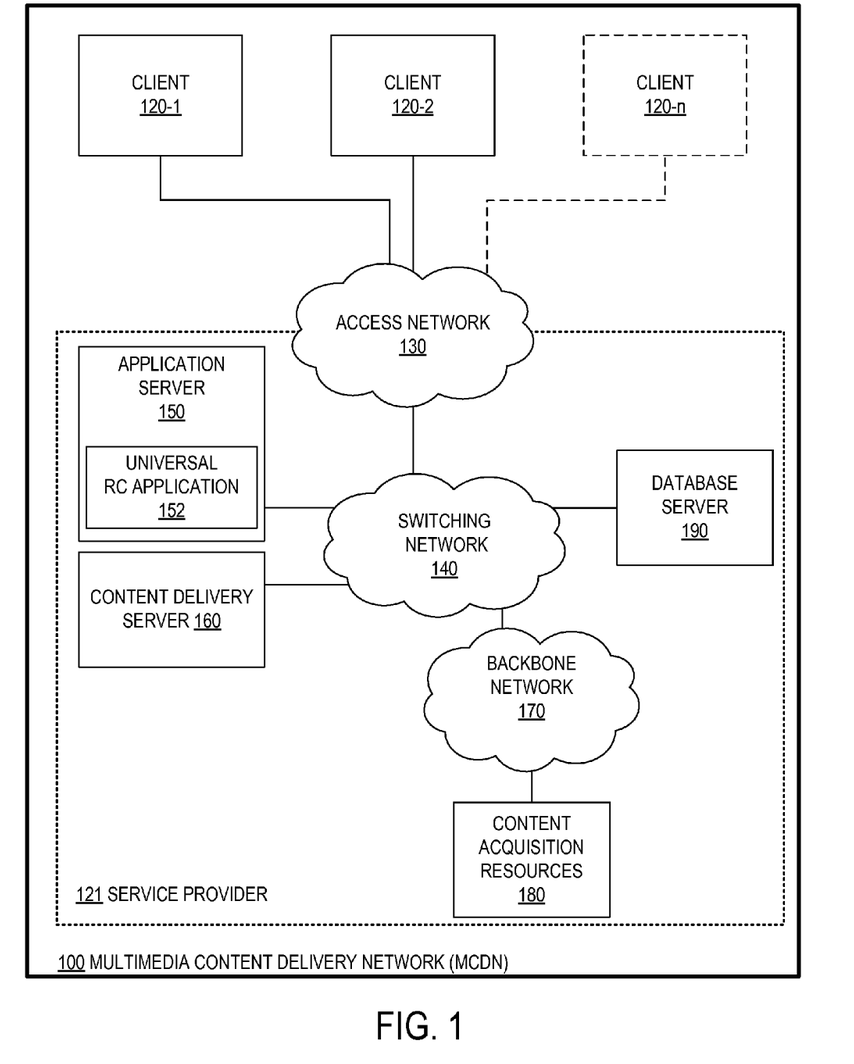
FIG. 1 is a block diagram of selected elements of an embodiment of a multimedia distribution network.

Turning now to the drawings, FIG. 1 is a block diagram illustrating selected elements of an embodiment of MCDN 100. Although multimedia content is not limited to TV, video on demand (VOD), or pay-per-view (PPV) programs, the depicted embodiments of MCDN 100 and its capabilities are primarily described herein with reference to these types of multimedia content, which are interchangeably referred to herein as "multimedia content", "multimedia content programs", "multimedia programs" or, simply, "programs."

The elements of MCDN 100 illustrated in FIG. 1 depict network embodiments with functionality for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

Access network 130 demarcates clients 120 and service provider 121, and provides at least one connection path between clients 120 and service provider 121. In some embodiments, access network 130 is an Internet protocol (IP) compliant network. In some embodiments, access network 130 is, at least in part, a coaxial cable network. It is noted that in some embodiments of MCDN 100, access network 130 is owned and/or operated by service provider 121. In other embodiments, a third party may own and/or operate at least a portion of access network 130.

In IP-compliant embodiments of access network 130, access network 130 may include a physical layer of unshielded twist pair cables, fiber optic cables, or a combination thereof MCDN 100 may include digital subscribe line (DSL) compliant twisted pair connections between clients 120 and a node (not depicted) in access network 130 while fiber, cable or another broadband medium connects service provider resources to the node. In other embodiments, the broadband cable may extend all the way to clients 120.

As depicted in FIG. 1, switching network 140 provides connectivity for service provider 121, and may be housed in a central office or other facility of service provider 121. Switching network 140 may provide firewall and routing functions to demarcate access network 130 from the resources of service provider 121. In embodiments that employ DSL compliant connections, switching network 140 may include elements of a DSL Access Multiplexer (DSLAM) that multiplexes many subscriber DSLs to backbone network 170.

In FIG. 1, backbone network 170 represents a private network including, as an example, a fiber based network to accommodate high data transfer rates. Content acquisition resources 180 as depicted in FIG. 1 encompass the acquisition of various types of content including broadcast content, other "live" content including national content feeds, and VOD content.

Thus, the content provided by service provider 121 encompasses multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming well in advance of the broadcast date and time. Some scheduled programs may be "regularly" scheduled programs, which recur at regular intervals or at the same periodic date and time (i.e., daily, weekly, monthly, etc.). Programs which are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Although service provider 121 is depicted in FIG. 1 as having switching network 140 to which content acquisition resources 180, content delivery server 160, and application server 150 are connected, other embodiments may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include URC application 152, which, as will be described in detail below, may be configured to cause client 120 of MCDN 100 to reprogram a URC device.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote-controlled devices, and programming codes for URCs.

Figure 2:
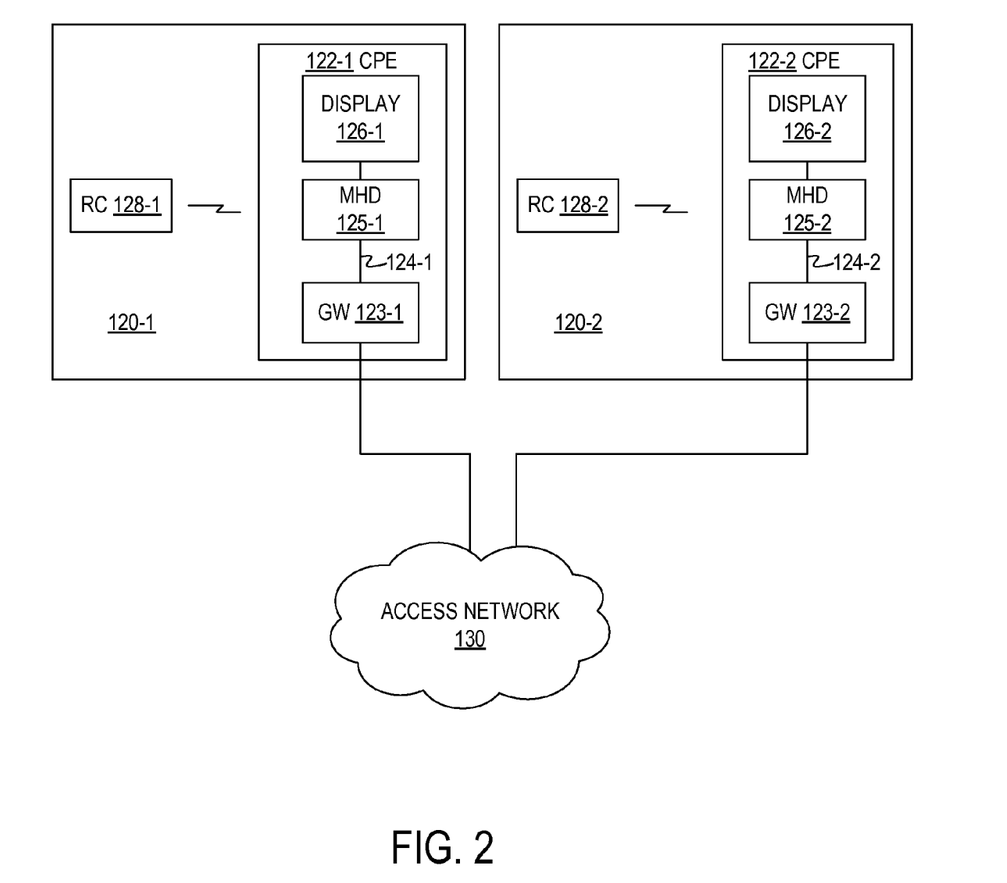
FIG. 2 is a block diagram of selected elements of an embodiment of a multimedia distribution network.

Turning now to FIG. 2, clients 120 are shown in additional detail with respect to access network 130. Clients 120 may include network appliances collectively referred to herein as CPE 122. In the depicted embodiment, CPE 122 includes the following devices: gateway (GW) 123, multimedia handling device (MHD) 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device.

In FIG. 2, GW 123 provides connectivity for client 120 to access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard such as National Television System Committee (NTSC), Phase Alternating Line (PAL), or another suitable standard. Display 126 may include one or more integrated speakers to play audio content.

Clients 120 are further shown with their respective remote control 128, which is configured to control the operation of MHD 125 by means of a user interface (not shown in FIG. 2) displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a URC device that is configured to control multiple pieces of equipment. When the equipment controlled by the URC device changes, the URC device may be reprogrammed, for example, to add a new device. The URC device may be programmed using a local transceiver (see FIG. 3) coupled to CPE 122. In some cases, CPE 122 may receive network commands to reprogram the URC device, as will be described in detail below.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet switched embodiments of access network 130 or modulated for delivery over cable-based access networks. In some embodiments, MHD 125 may be implemented as a stand-alone set top box suitable for use in a co-axial or IP-based MCDN.

Figure 3:
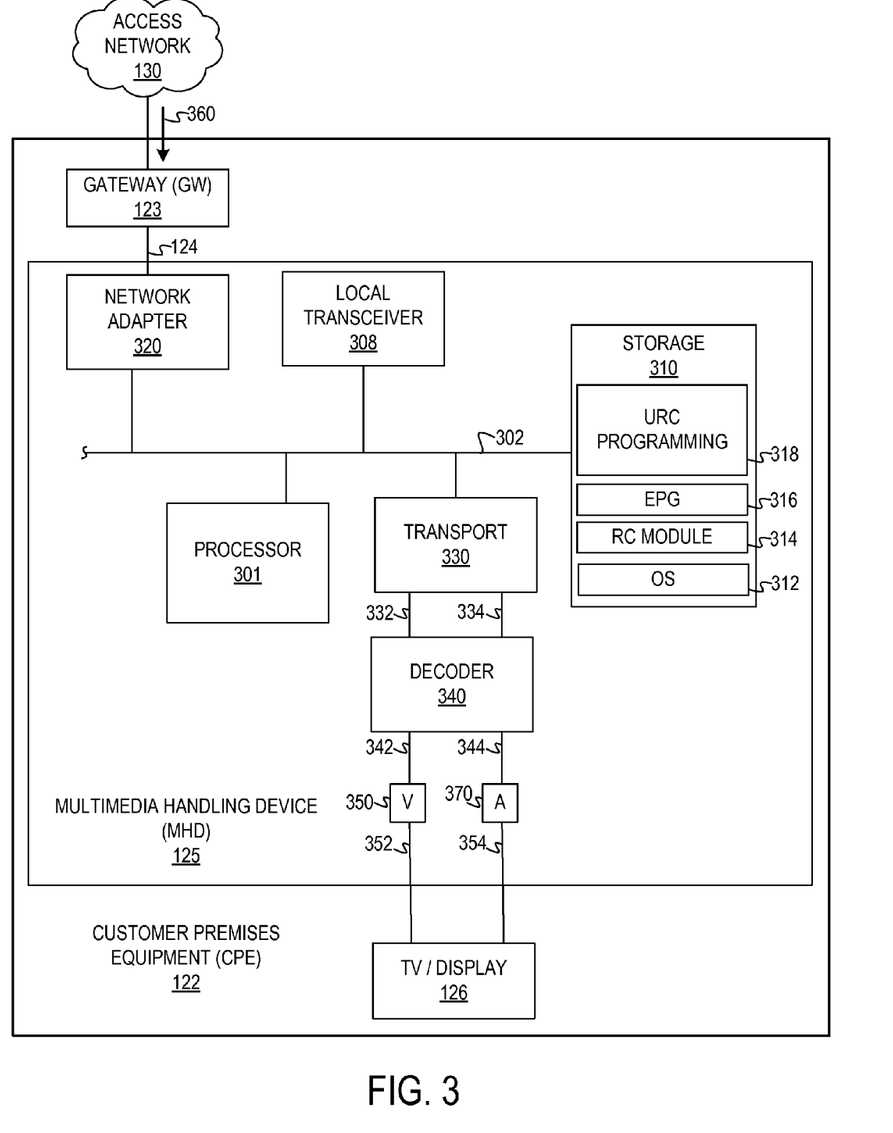
FIG. 3 is a block diagram of selected elements of an embodiment of a multimedia handling device.

Referring now to FIG. 3, a block diagram illustrating selected elements of an embodiment of MHD 125 is presented. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126.

In the embodiment depicted in FIG. 3, MHD 125 includes processor 301 coupled via shared bus 302 to storage media collectively identified as storage 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP based content delivery networks, MHD 125, as depicted in FIG. 3, may include transport unit 330 that assembles the payloads from a sequence or set of network packets into a stream of multimedia content. In coaxial based access networks, content may be delivered as a stream that is not packet based and it may not be necessary in these embodiments to include transport unit 330. In a co-axial implementation, however, clients 120 may require tuning resources (not explicitly depicted in FIG. 3) to "filter" desired content from other content that is delivered over the coaxial medium simultaneously and these tuners may be provided in MHDs 125. The stream of multimedia content received by transport unit 330 may include audio information and video information and transport unit 330 may parse or segregate the two to generate video stream 332 and audio stream 334 as shown.

Video and audio streams 332 and 334, as output from transport unit 330, may include audio or video information that is compressed, encrypted, or both. A decoder unit 340 is shown as receiving video and audio streams 332 and 334 and generating native format video and audio streams 342 and 344. Decoder 340 may employ any of various widely distributed video decoding algorithms including any of the Motion Pictures Expert Group (MPEG) standards, or Windows Media Video (WMV) standards including WMV 9, which has been standardized as Video Codec-1 (VC-1) by the Society of Motion Picture and Television Engineers. Similarly decoder 340 may employ any of various audio decoding algorithms including Dolby® Digital, Digital Theatre System (DTS) Coherent Acoustics, and Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may not be a part of MHD 125. Display 126 may comply with NTSC, PAL or any other suitable television standard.

Storage 310 encompasses persistent and volatile media, fixed and removable media, and magnetic and semiconductor media. Storage 310 is operable to store instructions, data, or both. Storage 310 as shown may include sets or sequences of instructions, namely, an operating system 312, a remote control application program identified as RC module 314, an EPG 316, and URC programming 318. Operating system 312 may be a UNIX or UNIX-like operating system, a Windows® family operating system, or another suitable operating system. In some embodiments, storage 310 is configured to store and execute instructions provided as services to client 120 by application server 150, as mentioned previously.

EPG 316 represents a guide to the multimedia content provided to client 120 via MCDN 100, and may be shown to the user as an element of the user interface. The user interface may include a plurality of menu items arranged according to one or more menu layouts, which enable a user to operate MHD 125. The user may operate the user interface, including EPG 316, using remote control 128 (see FIG. 2) in conjunction with RC module 314. In some embodiments, URC application 152 (see FIG. 1), in conjunction URC programming 318, provides functionality to reprogram or reconfigure a URC device, as will now be described in further detail below.

Local transceiver 308 represents an interface of MHD 125 for communicating with external devices, such as remote control 128, or another URC device. Local transceiver 308 may provide a mechanical interface for coupling to an external device, such as a plug, socket, or other proximal adapter. In some cases, local transceiver 308 is a wireless transceiver, configured to send and receive IR or RF or other signals. A URC device configured to operate with CPE 122 may be reconfigured or reprogrammed using local transceiver 308. In some embodiments, local transceiver 308 is also used to receive commands for controlling equipment from the URC device. Local transceiver 308 may be accessed by RC module 314 for providing remote control functionality.

Figure 4A:
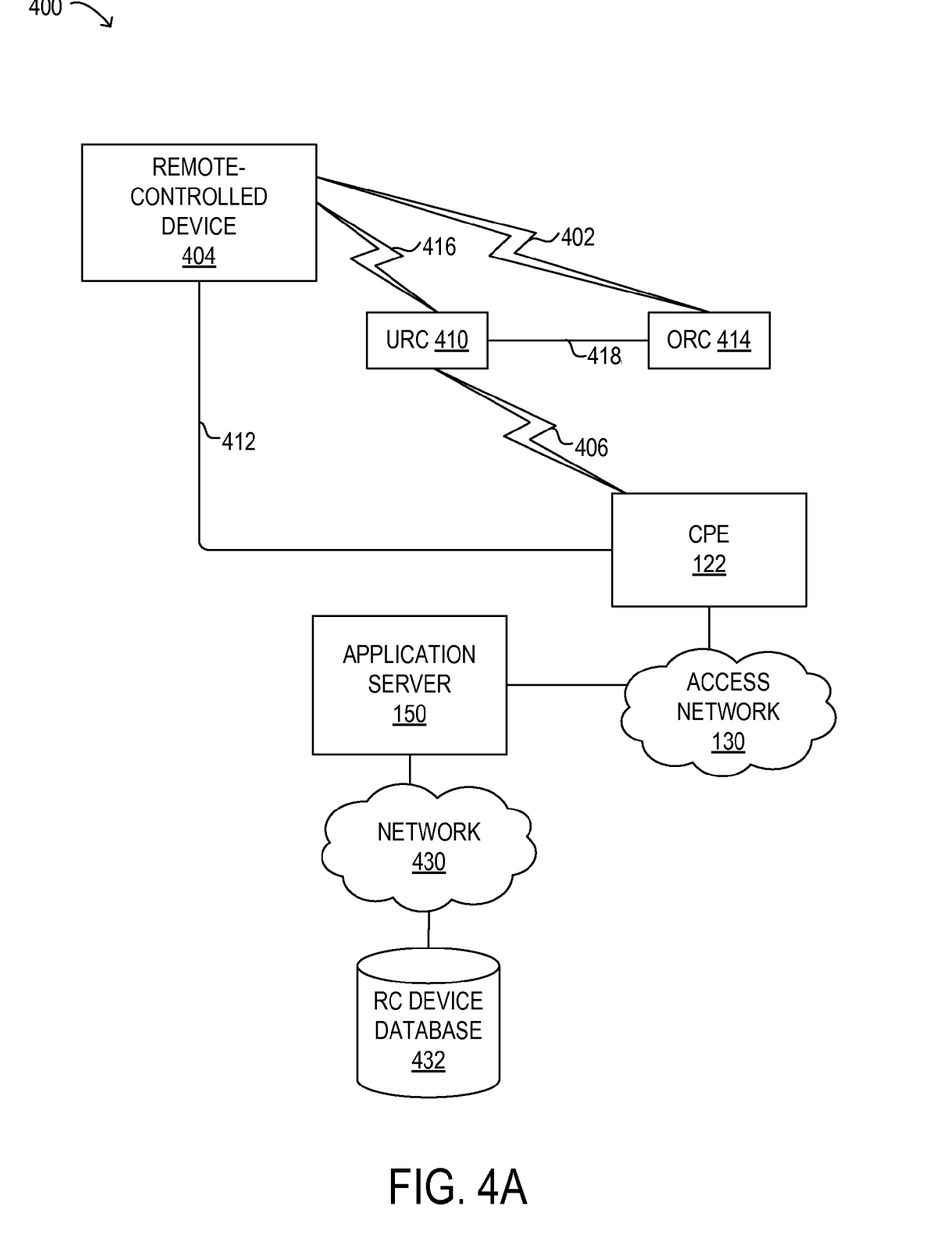
FIGS. 4A and 4B are block diagrams of selected elements of embodiments of a universal remote control system.

Turning now to FIG. 4A, a block diagram of selected elements of an embodiment of URC system 400 is depicted. In URC system 400, ORC 414, URC 410, and CPE 122 may be in proximity to remote-controlled device 404, for example at a location of an MCDN client 120 (see FIG. 1). URC system 400 illustrates devices, interfaces and information that may be processed, in one embodiment, to program URC 410 to control remote-controlled device 404. The reconfiguring, or reprogramming, of URC 410 may be complex, error prone, or time-consuming for a user. URC system 400 is a platform that may allow a user to reprogram URC 410 using services provided by MCDN 100. It is noted that in FIG. 4A, communication links 402, 406, and 416 may be wireless or mechanically connected interfaces. It is further noted that like numbered elements in FIG. 4A represent components discussed above with respect to FIGS. 1-3.

In FIG. 4A, remote-controlled device 404 may refer to a piece of equipment that is introduced for use with or near CPE 122. In some embodiments, remote-controlled device 404 may be controllable by remote control, and may be suitable for control by URC 410. Remote-controlled device 404 may also represent an existing instrument or device that is in use, but not yet controllable using URC 410, because URC 410 may not yet be configured to control remote-controlled device 404. Remote-controlled device 404 may further include one or more local transceivers or interfaces (not explicitly shown in FIG. 4) for communicating with remote controls, or for control by another piece of equipment, as will be described below.

ORC 414 may be a remote control that is dedicated for operation with remote-controlled device 404, for example, via communication link 402. That is, ORC 414 may represent original equipment provided with remote-controlled device 404, such that remote-controlled device 404 and ORC 414 may communicate via communication link 402 as a stand-alone unit. ORC 414 may be configured to use codes, or coded instructions, that are specific to remote-controlled device 404. ORC 414 may further be specific to a device-type (i.e., model, configuration, etc.) corresponding to remote-controlled device 404, such that ORC 414 may be operable with any manufactured instance of a particular device model, represented by remote-controlled device 404.

In some cases remote-controlled device 404 may be coupled to CPE 122, as shown by 412. The coupling 412 to CPE 122 may be subordinate in nature, such that remote-controlled device 404 may be controlled by CPE 122 in response to commands or signals received by local transceiver 308 (see FIG. 3). In URC system 400, CPE 122 is shown with exemplary coupling 412 to remote-controlled device 404. It is noted that coupling 412 is optional and may be omitted in certain embodiments.

In FIG. 4A, URC 410 may communicate with CPE 122 via communication link 406. Communication link 406 may be used to receive remote-control commands (i.e., in the form of codes or instructions) from URC 410. Alternatively, communication link 406 may be used to reprogram (i.e., reconfigure) URC 410 to send different commands or to control different equipment. For example, communication link 406 may be used to reconfigure URC 410 to use programming codes corresponding to remote-controlled device 404. In some instances, communication link 406 may be used to limit or delete existing functionality, for which URC 410 may be configured.

As shown in FIG. 4A, ORC 414 may communicate with URC 410 via communication link 418. Communication link 418 may be used by URC 410 to receive programming codes from ORC 414 that are specific to remote-controlled device 404. Communication link 418 may represent a variety, or a combination, of programming interfaces using different communication methods. In one embodiment, communication link 418 includes a programming interface that is physically coupled to URC 410 during programming. An example of a physical coupling is a galvanic connection. In certain embodiments, at least a portion of communication link 418 may represent a wireless coupling. For example, communication link 418 may represent a personal area network (PAN), such as Bluetooth™ or Zigbee™ near-field wireless interfaces.

In one embodiment, a programming interface using communication link 418 may be removably coupled to URC 410. In yet another embodiment, communication link 418 may be implemented as a near-field wireless interface using an RFID tag embedded in ORC 414 along with an RFID receiver included with URC 410. The RFID tag may store information identifying remote-controlled device 404 and/or programming codes therefor. As will be described in detail below, URC 410 may transition to a learning mode and acquire programming codes via communication link 418 from ORC 414.

In FIG. 4A, after URC 410 has been configured with at least some programming codes corresponding to remote-controlled device 404, URC 410 may communicate via communication link 416 with remote-controlled device 404. That is, URC 410 may emulate at least some functionality using communication link 416 that ORC 414 is capable of using communication link 402. From the perspective of remote-controlled device 404, communication links 402 and 416 may appear identical or indistinguishable. In other words, remote-controlled device 404 may not be aware that URC 410 is emulating ORC 414, and may respond to communication links 402 or 416 in an identical manner.

It is particularly noted that in FIG. 4A, two distinct pathways for URC 410 controlling remote-controlled device 404 are depicted in URC system 400. A first pathway is communication link 416, which represents direct control of remote-controlled device 404 by URC 410, without intervention from CPE 122. A second pathway is shown via CPE 122, using communication link 406 and coupling 412, as described above. In this configuration, URC 410 may directly communicate with CPE 122 via communication link 406, for example, using local interface 308 (see FIG. 3). CPE 122 may then relay or forward an instruction received by URC 410 to remote-controlled device 404 using coupling 412. It is noted that in the second pathway, the actual commands transmitted using communication link 406 and/or coupling 412 may be different from each other, and may further be different from actual commands transmitted by communication links 402 or 416. In other words, coupling 412 may represent an interface with its own command set, that is different from the actual command set used by ORC 414 via communication link 402. Further, using the second pathway, CPE 122 may configure URC 410 to transmit a different code using communication link 406 for a given command to control remote-controlled device 404 than what would be expected using communication link 402.

In FIG. 4A, CPE 122 may communicate with MCDN application server 150 via access network 130. Access network 130 may represent a "last-mile" access network providing service to a large number of MCDN client systems (see FIGS. 1-3). Application server 150 may, in turn, communicate with external systems using network 430, for example, with RC device database 432. As illustrated in FIG. 4A, application server 150 may retrieve RC device information from RC device database 432 over network 430. Network 430 may be a public or private network, while RC device database 432 may be operated by an external business entity. RC device database 432 may include device information for a variety of different RC devices, which may be controllable by URC 410. The RC device information may include programming codes for specific RC devices. Thus, application server 150 may query RC device database 432, in one embodiment, using a model identifier to retrieve programming codes for remote-controlled device 404. It is noted that in different embodiments (not shown in FIG. 4) RC device database 432 may be included as an internal component of application server 150, and may be accessed directly using network 430 or another network In operation of URC system 400, as shown in FIG. 4A, a user (not shown) may initiate a URC configuration by transitioning URC 410 to a learning mode. At least one ORC code may then be transferred from ORC 414 to URC 410 via communication link 418, as described above. The user may program (or reprogram) URC 410 control elements (not shown in FIG. 4A) to perform ORC 414 operations corresponding to the transferred ORC codes. A confirmation may be output by URC 410 indicating that URC 410 has been successfully configured to control remote-controlled device 404. URC 410 may transition back to an operating mode, and may then control remote-controlled device 404 in response to user input at a URC 410 control element.

After being successfully configured, URC 410 may control remote-controlled device 404. In one embodiment, URC 410 may use communication link 416 to directly control remote-controlled device 404. In other embodiments, URC 410 may control remote-controlled device 404 by communicating with CPE 122 via communication link 406, and in turn, via coupling 412.

Figure 4B:
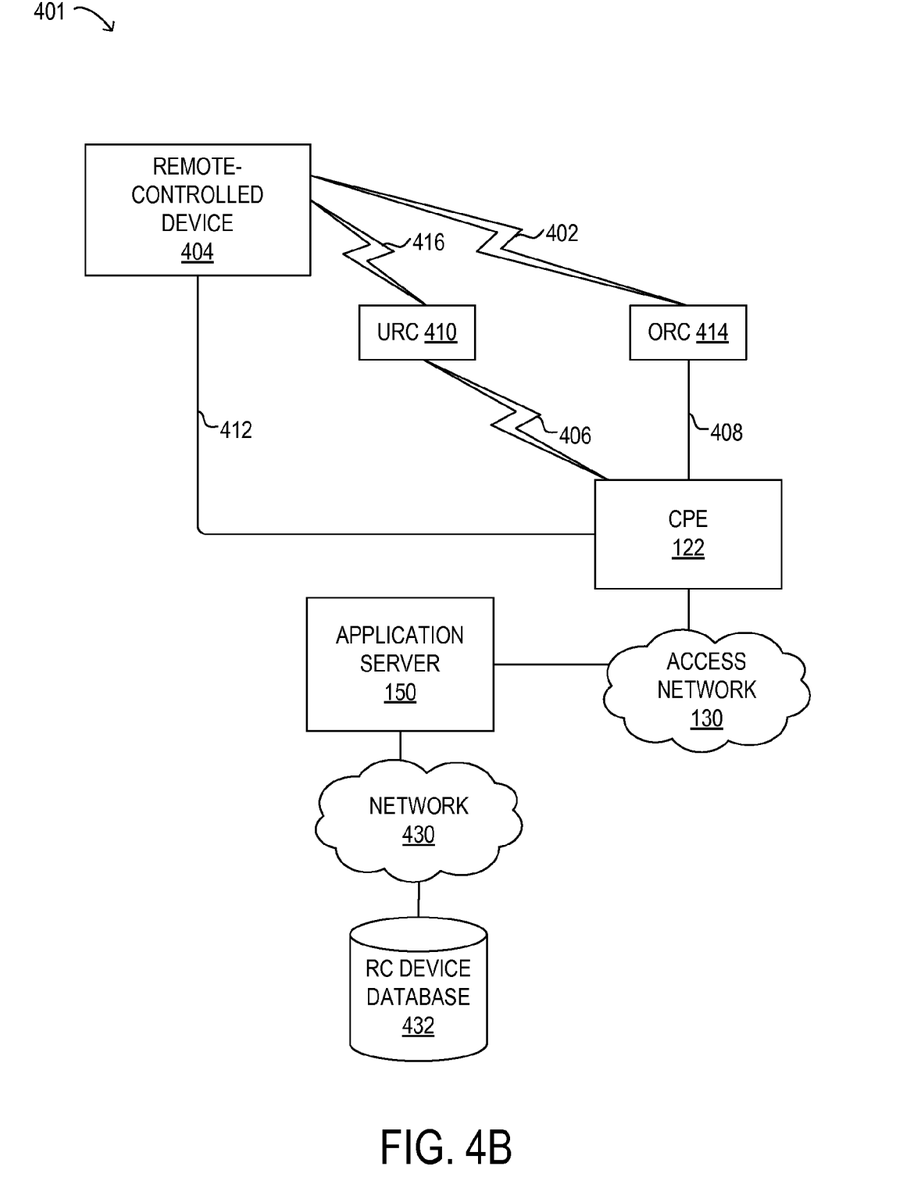

Turning now to FIG. 4B, a block diagram of selected elements of an embodiment of URC system 401 is depicted. It is noted that like numbered elements in FIG. 4B represent components and interfaces discussed in detail above with respect to FIG. 4A.

As shown in FIG. 4B, ORC 414 may communicate with CPE 122 via communication link 408. Communication link 408 may be used by CPE 122 to receive programming codes from ORC 414 that are specific to remote-controlled device 404. Communication link 408 may represent a variety, or a combination, of programming interfaces using different communication methods. In one embodiment, communication link 408 includes a programming interface that is physically coupled to CPE 122 during programming. An example of a physical coupling is a galvanic connection. In certain embodiments, at least a portion of communication link 408 may represent a wireless coupling. For example, communication link 408 may represent a PAN, such as Bluetooth™ or Zigbee™ near-field wireless interfaces. In one embodiment, a programming interface using communication link 408 may be removably coupled to CPE 122. In yet another embodiment, communications link 408 may be implemented as a near-field wireless interface using an RFID tag embedded in ORC 414 along with an RFID receiver included with CPE 122. The RFID tag may store information identifying remote-controlled device 404 and/or programming codes therefor. As will be described in detail below, CPE 122 may acquire programming codes via communication link 408 from ORC 414.

In one embodiment, CPE 122 may receive in indication of an identity of remote-controlled device 404 from ORC 414. CPE 122 may then display, or otherwise send, the identity of remote-controlled device 404 to the user. The user may then acknowledge and/or confirm the identity. Next, CPE 122 may now use the identity to query application server 150 for programming codes for remote-controlled device 404. In some instances, application server 150 may, in turn, obtain the programming codes from RC device database 432, which may be provided by a third-party. After obtaining or retrieving the desired programming codes, application server 150, executing URC application 152 (see FIG. 1), may send the programming codes back to CPE 122. CPE 122 may prompt the user to place URC 410 in a location accessible by communication link 406. CPE 122 may then program URC 410 with at least some of the programming codes. CPE 122 may display an indication of being ready to reprogram URC 410 and/or an indication that communication link 406 to URC 410 has been established. In some cases, CPE 122 may wait for user input before proceeding to configure URC 410. Finally, CPE 122 may send or display an acknowledgement to the user that URC 410 has been successfully configured for use with remote-controlled device 404 using communication link 406.

In certain embodiments, CPE 122 may query application server 150 for programming codes for remote-controlled device 404 that are specific to coupling 412. CPE 122 may then configure URC 410 with programming codes corresponding to at least some of the programming codes for remote-controlled device 404 using communication link 406.

After URC 410 has been programmed, or reprogrammed, CPE 122 may receive a confirmation via communication link 406, and may display an indication that URC 410 has been successfully configured to control remote-controlled device 404. In some cases, CPE 122 may transmit the confirmation/indication of successful URC configuration to application server 150, which may, in turn, send a confirmation to another device, such as a user mobile communications device, originating the URC configuration request.

Figure 5:
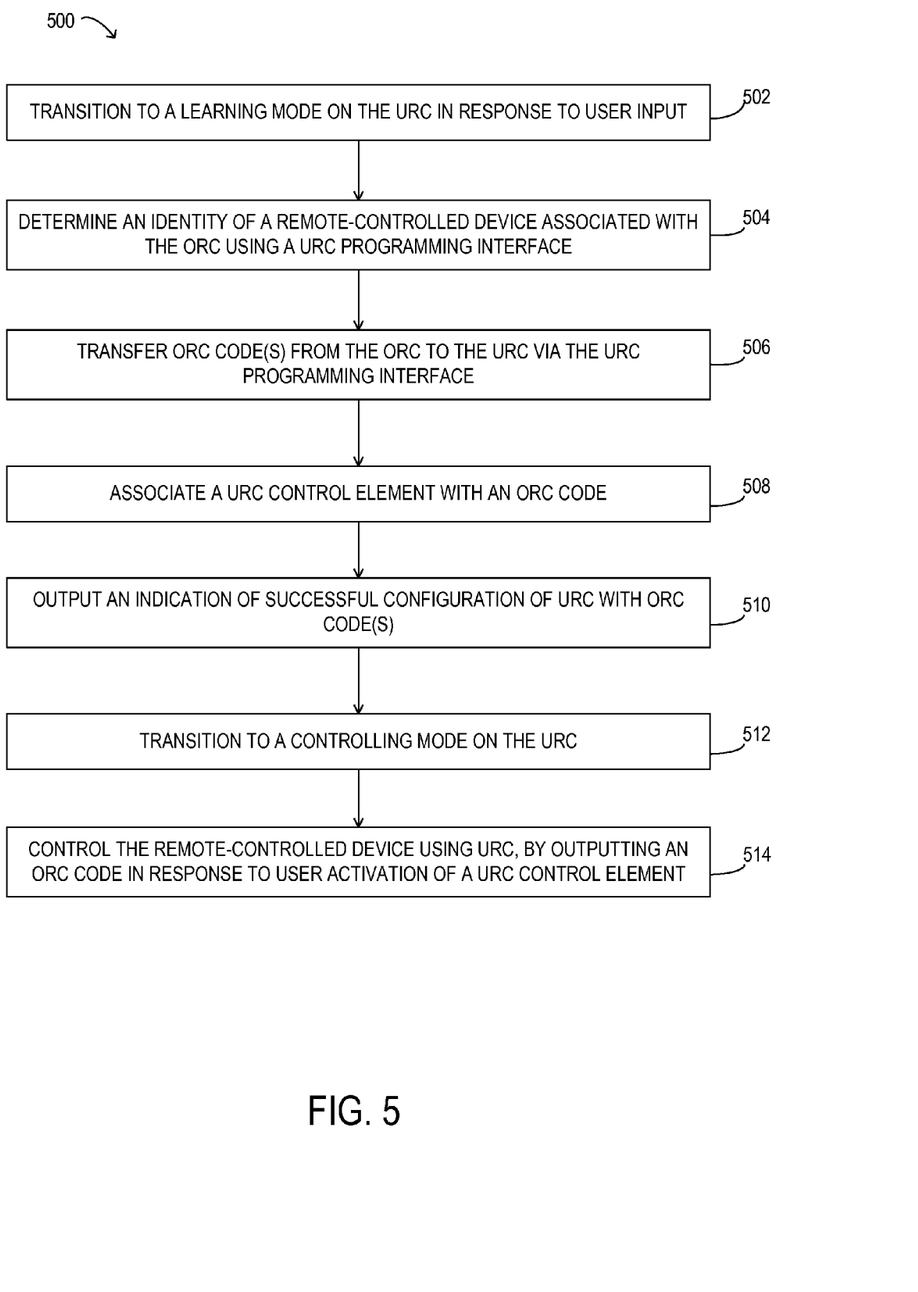
FIG. 5 illustrates an embodiment of a method for programming a universal remote control.

Turning now to FIG. 5, an embodiment of method 500 for programming a URC is illustrated. In one embodiment, method 500 is performed by URC 410. It is noted that certain operations described in method 500 may be optional or may be rearranged in different embodiments. In method 500, it is assumed that URC 410 is capable of controlling remote-controlled device 404 (see FIG. 4A).

Method 500 may begin by transitioning to a learning mode on the URC in response to user input (operation 502). The learning mode may permit reprogramming a URC, such as URC 410, to operate with the remote-controlled device, such as remote-controlled device 404 (see FIG. 4A). An identity of a remote-controlled device associated with the ORC may be determined using a URC programming interface (operation 504). In some instances, the programming interface is represented by communications link 418 (see FIG. 4A). At least one ORC code may then be transferred from the ORC to the URC via the URC programming interface (operation 506). In some embodiments, the URC is programmed with codes corresponding to respective programming codes for the remote-controlled device, such that the URC can generate commands associated with the programming codes. A URC control element may be associated with an ORC code (operation 508). Operation 508 may be repeated for different URC control elements, as desired. A user operating the URC may provide user input for assigning URC control elements to ORC codes. A URC control element may be reprogrammed in operation 508. An indication of successful configuration of the URC with at least one ORC code may be output (operation 510).

Next, method 500 may transition to a controlling mode on the URC (operation 512). The remote-controlled device may be controlled using the URC by outputting an ORC code in response to user activation of a URC control element (operation 514). In some embodiments, the ORC code may be output to CPE 122, which in turn may control remote-controlled device 404 via coupling 412 (see FIG. 4A).

Figure 6:
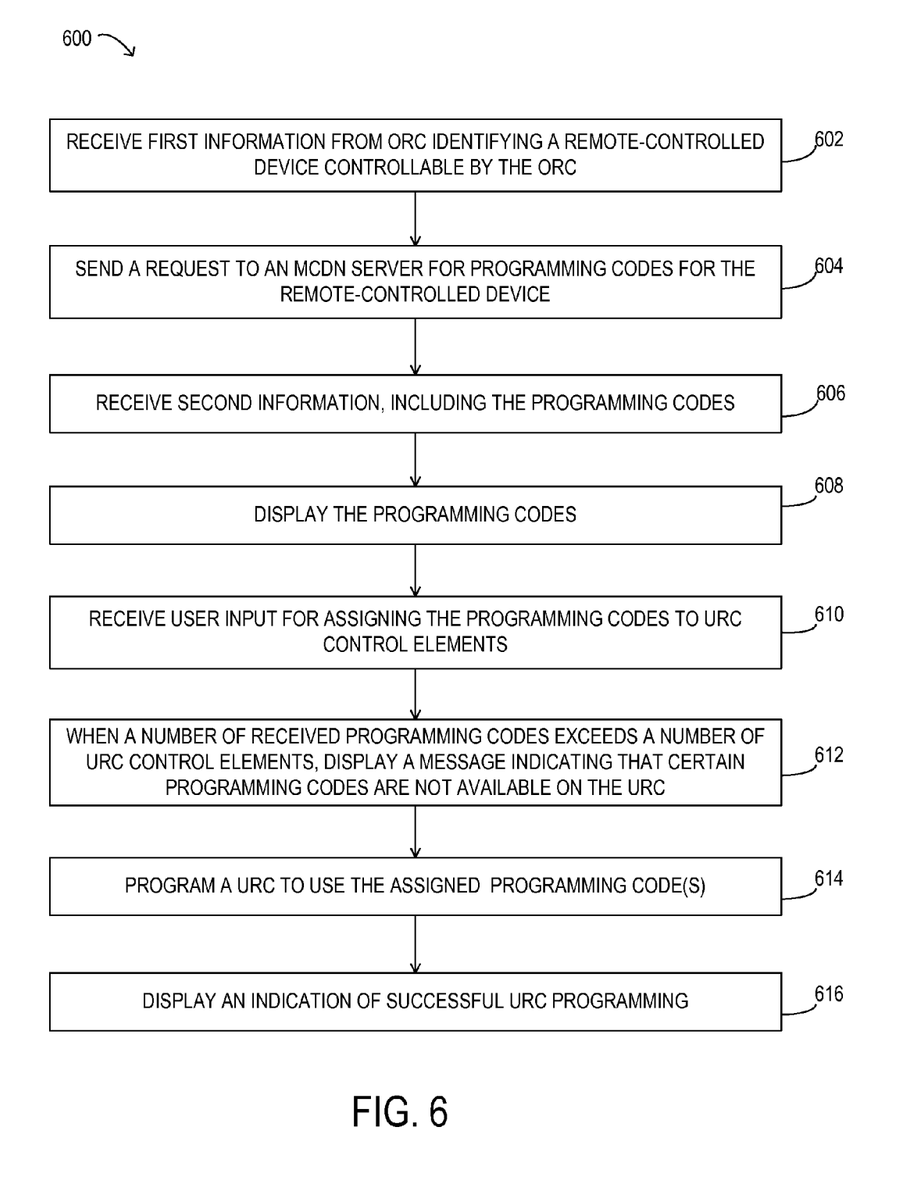
FIG. 6 illustrates an embodiment of a method for programming a universal remote control.

Turning now to FIG. 6, an embodiment of method 600 for programming a URC is illustrated. In one embodiment, method 600 is performed by URC programming 318 executing on MHD 125 of CPE 122. Method 600 may also be performed in conjunction with functionality provided by URC application 152 executing on application server 150. It is noted that certain operations described in method 600 may be optional or may be rearranged in different embodiments. In method 600, it is assumed that remote-controlled device 404 has been introduced alongside CPE 122 of MCDN client 120, and that URC 410 is capable of controlling remote-controlled device 404 (see FIG. 4B).

Method 600 may begin by receiving, from an ORC, first information identifying a remote-controlled device controllable by the ORC (operation 602). The first information may be received via a programming interface on the CPE. A request may be sent to an MCDN server for programming codes for the remote-controlled device (operation 604). The MCDN server may obtain the programming codes from an external source, such as a third-party database of programming codes. Then, second information, including the programming codes, may be received (operation 606). The second information may be received by the CPE from the MCDN server. The programming codes may be displayed (operation 608). The CPE may display the programming codes to a user on a display device.

User input may be received for assigning the programming codes to URC control elements (operation 610). The user may provide input for reassigning or rearranging available URC control elements. The URC control elements may be configured to control more than one remote-controlled device, including the CPE. When a number of received programming codes exceeds a number of URC control elements, a message indicating that certain programming codes are not available on the URC may be displayed (operation 612). The URC may be programmed to use the assigned programming codes (operation 614). The CPE may communicate in a bidirectional manner with the URC to program the URC. Finally, an indication of successful URC programming may be displayed (operation 616). If the URC programming was not successful, then a corresponding indication of failure may be displayed. In some embodiments, the indication of successful URC programming not being displayed may serve as a failure indication. If a failure indication is generated, then certain portions of method 600 may be repeated until successful. The failure indication may include further instructions or a diagnostic message describing the cause of the failure.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method for configuring a universal remote control using consumer-premises equipment of a multimedia content distribution network, comprising:
    establishing a connection, between the consumer-premises equipment and an original remote control, to receive an original remote control code, wherein the connection is selected from a near-field wireless connection and a galvanic coupling;
    receiving, via an original remote control interface, an original remote control code describing output generated by the original remote control for controlling a remote-controlled device; and
    configuring the universal remote control to control the remote-controlled device by sending the original remote control code to the universal remote control.

2. The method of claim 1, wherein establishing the near-field wireless connection is accomplished using a radio-frequency identification device coupled to the original remote control and a radio-frequency identification receiver coupled to the consumer-premises equipment.

3. The method of claim 1, wherein the near-field wireless connection is a personal area network connection.

4. The method of claim 1, further comprising:
    displaying the original remote control code; and
    receiving user input for assigning original remote control codes to universal remote control elements, wherein said configuring the universal remote control is based on the user input.

5. A consumer-premises equipment for use within a client configuration of a multimedia content distribution network, comprising:
    a processor; and
    memory media accessible to the processor, including instructions executable by the processor to:
        receive first information from an original remote control identifying a remote-controlled device controllable by the original remote control;
        send a request to a multimedia content distribution network server for programming codes for the identified remote-controlled device;
        after sending the request, receive second information, including the programming codes; and
        program a universal remote control to use at least one of the programming codes.

6. The consumer-premises equipment of claim 5, further comprising processor executable instructions to:
    display the programming codes to the user in response to first user input; and receive second user input specifying which of the programming codes to use for programming the universal remote control.

7. The consumer-premises equipment of claim 5, wherein the remote-controlled device is communicatively coupled to the consumer-premises equipment, and further comprising processor executable instructions to:
  receive, from the universal remote control, a command to control the remote-controlled device, wherein the command is associated with at least one of the programming codes; and
  instruct the remote-controlled device to execute the command.

8. The consumer-premises equipment of claim 5, further comprising processor executable instructions to:
  display an indication that the universal remote control has been successfully programmed.

9. The consumer-premises equipment of claim 5, wherein a number of received programming codes exceeds a number of control elements available on the universal remote control, and further comprising processor executable instructions to:
  display a message indicating that certain programming codes are not available on the universal remote control.

10. Computer-readable memory media, including executable instructions for configuring a universal remote control, said instructions executable to:
  establish a near-field wireless connection with an original remote control for receiving a remote control code;
  receive the original remote control code from the original remote control via a programming interface; and
  use the original remote control code to control a remote-controlled device.

11. The memory media of claim 10, further comprising instructions executable to:
  initiate a learning mode on the universal remote control in response to user input.

12. The memory media of claim 10, further comprising instructions executable to:
  output an indication that the universal remote control has been configured successfully to use the original remote control code.

13. The memory media of claim 12, further comprising instructions executable to:
  associate a universal remote control element with an original remote control code.

14. The memory media of claim 13, further comprising instructions executable to:
  in response to detecting user input activating the universal remote control element, output the associated original remote control code to the remote-controlled device.

15. The memory media of claim 13, further comprising instructions executable to:
  reconfigure a previously configured universal remote control element by configuring the universal remote control element to correspond to an original remote control code.

* * * * *

UNITED STATES PATENT AND TRADEMARK OFFICE
CERTIFICATE OF CORRECTION

PATENT NO. : 8,410,970 B2  
APPLICATION NO. : 12/540979  
DATED : April 2, 2013  
INVENTOR(S) : Paul Van Vleck et al.

Page 1 of 1

It is certified that error appears in the above-identified patent and that said Letters Patent is hereby corrected as shown below:

In the Claims

Column 14, lines 13-16, please correct Claim 13 as follows:

13. The memory media of claim 12, further comprising instructions executable to:

associate a universal remote control control element with an original remote control code.

Column 14, lines 17-21, please correct Claim 14 as follows:

14. The memory media of claim 13, further comprising instructions executable to:

in response to detecting user input activating the universal remote control control element, output the associated original remote control code to the remote-controlled device.

Column 14, lines 22-27, please correct Claim 15 as follows:

15. The memory media of claim 13, further comprising instructions executable to:

reconfigure a previously configured universal remote control control element by configuring the universal remote control control element to correspond to an original remote control code.

Signed and Sealed this  
Third Day of December, 2013

Margaret A. Focarino  
*Commissioner for Patents of the United States Patent and Trademark Office*